US006997787B2

US006997787B2

(12) United States Patent
Gatton et al.

(10) Patent No.: US 6,997,787 B2
(45) Date of Patent: Feb. 14, 2006

(54) PROCESS FOR COPPER FREE CHROME PLATING OF A VEHICLE WHEEL SURFACE

(75) Inventors: Geoffrey L. Gatton, Farmington, MI (US); Lou Grenier, Manchester, MI (US); Peter Yee, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/994,722

(22) Filed: Nov. 22, 2004

(65) Prior Publication Data

US 2005/0120557 A1   Jun. 9, 2005

Related U.S. Application Data

(60) Continuation-in-part of application No. 10/756,856, filed on Jan. 14, 2004, now Pat. No. 6,893,330, and a continuation-in-part of application No. 10/309,726, filed on Dec. 4, 2002, now Pat. No. 6,733,366, which is a division of application No. 09/725,528, filed on Nov. 29, 2000, now Pat. No. 6,540,450.

(60) Provisional application No. 60/450,013, filed on Feb. 26, 2003, provisional application No. 60/440,914, filed on Jan. 17, 2003, provisional application No. 60/246,663, filed on Nov. 8, 2000.

(51) Int. Cl.
*B24B 1/00* (2006.01)

(52) U.S. Cl. ............... 451/54; 451/540; 427/404; 427/405; 205/205; 205/206; 205/170; 205/178; 205/183; 205/184; 205/283

(58) Field of Classification Search .............. 451/41, 451/54, 29, 319, 324, 397, 398, 540, 552; 427/404, 405; 205/205, 206, 170, 178, 183, 205/184, 283
See application file for complete search history.

(56) References Cited

U.S. PATENT DOCUMENTS

| 2,977,669 A | 4/1961 | Chambers |
| 3,289,271 A | 12/1966 | Stier |
| 3,760,660 A | 9/1973 | Van Arman et al. |
| 4,118,846 A | 10/1978 | Korte |
| 4,189,264 A | 2/1980 | Kraemer |
| 4,835,826 A | 6/1989 | Wilson |
| 4,898,499 A | 2/1990 | Tsujimura et al. |
| 4,929,315 A | 5/1990 | Schaper et al. |
| 4,990,036 A | 2/1991 | Eklundo et al. |
| 5,017,055 A | 5/1991 | Tsujimura et al. |
| 5,099,558 A | 3/1992 | Wilson |
| 5,329,684 A | 7/1994 | Budet et al. |
| 5,383,526 A | 1/1995 | Brady |
| 5,486,073 A | 1/1996 | Satran et al. |
| 5,486,137 A | 1/1996 | Flood et al. |

(Continued)

FOREIGN PATENT DOCUMENTS

DE   31 18 266   11/1982

(Continued)

*Primary Examiner*—Joseph J. Hail, III
*Assistant Examiner*—Shantese L. McDonald
(74) *Attorney, Agent, or Firm*—MacMillan, Sobanski & Todd, LLC

(57) ABSTRACT

A cutting tool having a hard tip is pressed with a uniform pressure against a surface of a vehicle wheel as the wheel is rotated to smooth and seal the surface. The smoothed and sealed wheel surface is then chrome plated with a process that includes applying a nickel layer directly upon smoothed and sealed wheel surface and a chromium layer over the nickel layer.

30 Claims, 9 Drawing Sheets

U.S. PATENT DOCUMENTS

| | | |
|---|---|---|
| 5,494,477 A | 2/1996 | Flood et al. |
| 5,531,024 A | 7/1996 | Lowe et al. |
| 5,643,055 A | 7/1997 | Linzell |
| 5,728,426 A | 3/1998 | Wei |
| 5,771,763 A | 6/1998 | Naslund et al. |
| 5,803,553 A | 9/1998 | Wei |
| 5,951,215 A | 9/1999 | Paya et al. |
| 6,065,377 A | 5/2000 | Harada et al. |
| 6,082,936 A | 7/2000 | Moriguchi et al. |
| 6,155,755 A | 12/2000 | Kanada et al. |
| 6,220,795 B1 | 4/2001 | Matthews |
| 6,241,430 B1 | 6/2001 | Norström |
| 6,315,502 B1 | 11/2001 | Maurer |
| 6,609,859 B1 | 8/2003 | Sjöö |

FOREIGN PATENT DOCUMENTS

| | | |
|---|---|---|
| DE | 100 34 228 | 2/2001 |
| EP | 0 313 534 | 4/1989 |
| EP | 0 638 383 | 2/1995 |
| EP | 1 211 025 | 6/2002 |
| GB | 2 339 713 | 2/2000 |
| JP | 08 118104 | 5/1996 |
| JP | 2000 127702 | 5/2000 |
| WO | 98/41360 | 9/1998 |
| WO | 01/32339 | 5/2001 |

PROCESS FOR COPPER FREE CHROME PLATING OF A VEHICLE WHEEL SURFACE

CROSS REFERENCE TO RELATED APPLICATIONS

This application is a Continuation-in Part of application U.S. patent application Ser. No. 10/756,856 filed Jan. 14, 2004, now U.S. Pat. No. 6,893,330, which claims the benefit of U.S. Provisional Patent Application No. 60/440,914 filed on Jan. 17, 2003, and of U.S. Provisional Patent Application No. 60/450,013 filed on Feb. 26, 2003 for the new matter contained therein, and which was a Continuation-in Part of U.S. patent application Ser. No. 10/309,726 filed Dec. 4, 2002, now U.S. Pat. No. 6,733,366 which issued on May 11, 2004 and which was, in turn, a divisional of U.S. patent application Ser. No. 09/725,528 filed on Nov. 29, 2000, now U.S. Pat. No. 6,540,450 which issued Apr. 1, 2003, and claimed the benefit of U.S. Provisional Patent Application No. 60/246,663 filed on Nov. 8, 2000.

BACKGROUND OF INVENTION

This invention relates in general to vehicle wheels and in particular to a method and cutting tool for machining a portion of the vehicle wheel outboard face to produce a smooth surface and a process for chrome plating the smooth surface.

Vehicle wheels typically include an annular wheel rim and a circular wheel disc. The wheel disc can be formed across the outboard end of the wheel rim or recessed within the wheel rim. The wheel rim is adapted to carry a pneumatically inflated tire. The wheel rim has inboard and outboard tire retaining flanges formed on the ends thereof which extend in an outward radial direction to retain the tire on the wheel. Inboard and outboard tire bead seats are formed on the outer surface of the wheel rim adjacent to the corresponding tire retaining flange to support the tire wall beads and form an air-tight seal therewith. The wheel rim also includes a reduced diameter deep well between the tire bead seats to facilitate mounting the tire upon the wheel.

The wheel disc includes a central wheel hub for mounting the wheel upon a vehicle. The inboard face of the wheel disc hub is typically machined to form a flat surface to assure good contact between the wheel disc and the vehicle wheel hub. A pilot hole and a plurality of wheel stud holes extend through the wheel hub. The pilot hole is centered on the hub and the stud holes are spaced equally about a bolt hole circle which is concentric with the pilot hole. The pilot hole can receive the end of an axle while the wheel stud holes receive wheel studs for attaching the wheel to the vehicle. The wheel disc also typically includes a plurality of wheel spokes which extend radially from the wheel hub to the wheel rim and support the hub within the rim.

Referring now to the drawings, a flow chart for a wheel manufacturing process is shown in FIG. 1. In functional block 10, a wheel is cast in a single piece from a light weight metal such as aluminum, magnesium or titanium, or an alloy of a light weight metal. Such wheels are becoming increasingly popular because they weigh less than conventional steel wheels and can include outboard wheel disc faces which are formed in a pleasing aesthetic shape. One piece wheel castings are usually formed by a gravity or low pressure casting process. The wheel castings are finished by machining to a final shape.

Two separate machining stations are typically used to finish a wheel casting. In functional block 11, the outboard end of a rough wheel casting is clamped to the face of a first wheel lathe for a first set of machining operations. A wheel lathe is a dedicated machine designed to finish wheels. Wheel lathes typically include a plurality of cutting tools mounted upon a lathe turret. The turret is indexed to sequentially move each of the tools to the surface of the wheel casting. Wheel lathes are usually operated under Computer Numerical Control (CNC) to sequentially perform a number of related machining operations. For example, a wheel lathe turret can be equipped with a turning tool, a facing tool and a drill bit and the wheel lathe can be programmed to sequentially turn, face and bore a wheel casting. The wheel lathe face typically includes a chuck having a plurality of jaws which grip the outboard wheel retaining flange and tire bead seat. Consequently, the outboard wheel rim end is not finished during the first set of machining operations.

The outside and inside surfaces of the wheel rim are turned to their final shapes and the inboard surface of the wheel hub is faced in functional block 12. Additionally, the inboard end of the wheel rim is finished. The partially finished wheel casting is removed from the first wheel lathe, reversed and clamped on a second wheel lathe for a second set of machining operations in functional block 13. During the second set of machining operations, the inboard wheel flange and tire bead seat are gripped in the jaws of the wheel lathe chuck, exposing the outboard surface of the wheel disc and the outboard end of the wheel rim for machining.

In functional block 14, the second wheel lathe turns and faces the outboard wheel face. During these operations, the outboard tire retaining flange and the outboard tire bead seat also are turned to final shapes. The surface of the hubcap retention area is machined to final shape and the stud mounting holes are drilled through the hub in functional block 15. Alternately, the wheel casting may be removed from the wheel lathe and the drilling operation completed at another work station.

During the facing and other machining operations, very fine grooves are formed in the surfaces of the wheel. Accordingly, the surface of the wheel is typically subjected to a finishing step, as shown in functional block 16. A typical finishing process involves polishing the wheel surface to smooth the grooves and provide a lustrous appearance to the surface of the wheel. The polishing is usually followed by application of a clear coating to protect the polished wheel surface.

A typical polishing and chrome plating operation is illustrated by a flow chart in FIG. 2. Polishing typically involves a first step of rough buffing with an abrasive compound as shown in functional block 20. The buffed wheel is degreased in functional block 21. One frequently used method of degreasing involves passing the wheel through a chamber which is filled with a solvent vapor. The solvent vapor condenses upon wheel, covering the entire wheel surface. Once the solvent has had a sufficient time to dissolve any surface grease, the solvent is washed from the wheel to complete the degreasing. As shown in functional block 22, the wheel is then wet polished with a liquid lubricant for the polishing abrasive. The wheel is usually rotated and rotating polishing wheels are applied to the surface while a slurry of polishing abrasive and a carrier fluid is applied to the wheel surface. Next the wheel is rinsed in functional block 23. Typically, deionized water is used for the rinse.

The substances utilized during wheel polishing are generally toxic in nature. Accordingly, it is common practice to ship the wheels to a polishing contractor who employs safety procedures to protect personnel. The contractor is also equipped to dispose of the toxic wastes generated by the polishing operations.

The polished wheel surface is buffed in functional block 24. Typically, the buffing step utilizes a rag and buffing compound to create a surface smooth and shiny enough to achieve the generally accepted smoothness and clarity required for chrome plating an aluminum wheel. The wheel is now ready for the chrome plating process.

The chrome plating, which may be provided at the polishing facility, or after shipment of the wheel to an off-site chrome plating facility, consists of depositing a number of metal layers upon the surface of the polished wheel. Chrome plating involves the deposition of multiple metallic layers upon the wheel surface and begins in functional block 26, where a layer of copper 28 is chemically deposited upon the polished surface of a wheel 30, as illustrated in FIG. 4 by a fragmentary sectional view of a portion of a wheel surface. Typically, the portion of the wheel being plated is immersed in a chemical bath containing copper in solution. An electric current is passed though the copper solution and the wheel to attract the copper to the wheel surface where it chemically bonds to the wheel metal. The copper layer 28 is then buffed in functional block 32 to provide a smooth surface for deposition of the remaining layers.

The copper layer 28 is needed to form a barrier between the subsequently applied layers and the wheel surface. During casting of the wheel, a sealing layer is formed upon the wheel surface, such as, for example, aluminum oxide upon an aluminum cast wheel. However, when surfaces of the wheel of the wheel are machined, the sealing layer is removed, exposing surface pores that may absorb moisture. Over time, the trapped moisture may begin to oxidize the chromed surface from underneath. Additionally, as described above, the polishing process to prepare the wheel for plating uses polishing compounds that may be trapped within the surface pores and may begin to oxidize over time, which also would have an adverse effect upon the appearance of the plated surface. Therefore, the copper layer 28 is applied to form a barrier, or sealing layer, between the wheel surface and the subsequently applied layers.

Continuing to the next step shown in the flow chart of FIG. 2, a layer of semi-bright nickel 34 is chemically deposited over the copper layer 28 in functional block 36. The semi-bright nickel layer 34 provides additional corrosion resistance for the plated surface. Next, in functional block 38, a layer of bright nickel 40 is chemically deposited over the semi-bright nickel layer 34 to provide reflectivity and brightness to the wheel surface. Finally, in functional block 42 a layer of chromium 44 is chemically deposited over the bright nickel layer 34 to prevent nickel fogging. Typically, the nickel and chromium layers 34, 40 and 42 are formed by immersing the portion of the wheel being plated in a chemical bath containing a solution of the particular metal to be deposited upon the wheel surface. As described above, an electrical current is passed through the solution and the wheel to attract the metal to the wheel surface. Thus, each layer is chemically bonded to the preceding layer to provide a durable and attractive decorative surface coating on the wheel.

SUMMARY OF INVENTION

This invention relates to a method and improved cutting tool for machining a portion of a vehicle wheel surface to produce a smooth and sealed surface and a process for chrome plating the machined surface.

As described above, it is known to polish and buff an aluminum wheel surface prior to chrome platting. However, such processes require abrasives and solvents. The polishing and buffing can create slight waves or subtle uniform variations in the polished surface due to harmonic oscillations of the power equipment used and differing amounts of work pressure exerted on the surface due to different elevations of the geometric designs of the wheel surface. When polishing and buffing is done by hand, the variations are more random due to fatigue of the human muscles and the inability to make exact dimensional repeated motions. Thus, conventional polishing and buffing methods are known to produce a slightly distorted reflection that is similar to looking through an antique glass pane that has experienced some flow of its molecular structure. Such flow can cause a certain amount of refraction or deflection of the light rays passing through the glass. Therefore, it would be desirable to provide a process for smoothing a wheel surface that does not require conventional polishing and buffing.

Furthermore, typical solvents include trichloroethylene, trichloroethane, sulfuric acid and perchloroethylene, which are toxic. Additionally, the lubricants for the abrasives can include animal lubricants such as grease and lard. The polishing wheels can produce air-borne lint during the polishing and buffing operation. Accordingly, it is necessary to protect the workers from these materials and collect and dispose of the residues. Because of the complexity of the polishing operations and the need to appropriately control the environmental impact of the materials utilized, wheels are often shipped to an outside contractor for polishing. This involves additional time and expense. Thus, it would be desirable to smooth the wheel face without polishing the wheel.

Additionally, know processes for chrome plating a vehicle wheel surface require numerous discrete steps. Accordingly, it would be desirable to simplify the chrome plating process by eliminating one or more of the steps.

The present invention contemplates a vehicle wheel comprising an annular wheel rim portion and a wheel disc formed across the wheel rim. The wheel disc has an outboard face which includes a smoothed portion to provide a pleasing cosmetic appearance. It is further contemplated that the smoothed portion of the wheel disc face can extend over the entire surface of the wheel disc outboard face. An optional protective coating can be formed over the smoothed portion of the wheel disc face.

The present invention further includes a process for forming a decorative surface upon a vehicle wheel face which comprises providing a machined vehicle wheel including a wheel rim and having a wheel disc extending radially across the wheel rim. The machined wheel is mounted in a lathe. The wheel is rotated while a cutting tool having a hardened tip is urged with a uniform cutting pressure against the outboard surface of the wheel disc to smooth and seal the pores in at least a portion of the wheel disc surface. In the preferred embodiment, the cutting tool has a hardened tip that is formed upon an insert of poly or mono crystalline material mounted on one end of the tool. The invention also contemplates smoothing the entire outboard face of the wheel disc. Subsequent to smoothing the wheel face, the smoothed portion of wheel face is chrome plated by depositing a nickel layer directly upon the smoothed surface. A layer of chromium is then deposited over the nickel layer. Alternately, the invention also contemplates depositing a second layer of nickel between the nickel layer deposited upon the smoothed surface and the layer of chromium with the layer adjacent to the wheel surface including semi-bright nickel and the second layer including bright nickel.

Various objects and advantages of this invention will become apparent to those skilled in the art from the following detailed description of the preferred embodiment, when read in light of the accompanying drawings.

DETAILED DESCRIPTION

Figure 4:
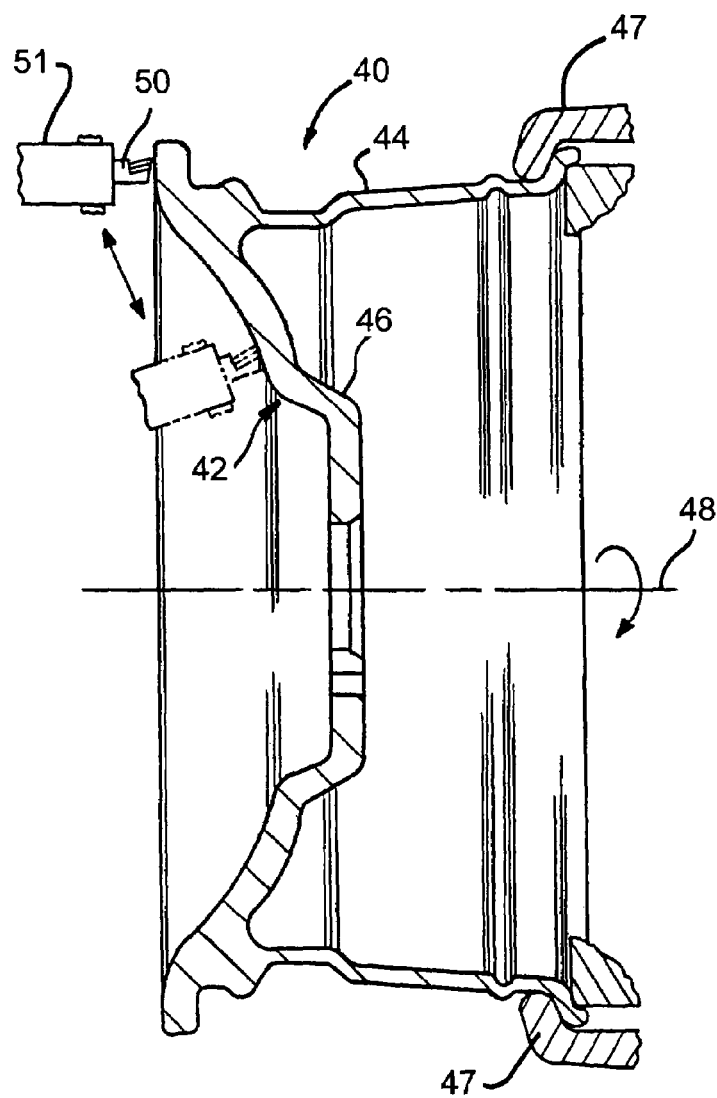
FIG. 4 is a sectional view of a vehicle wheel and illustrates a process for finishing the vehicle wheel face in accordance with the invention.

Referring again to the drawings, there is illustrated in FIG. 4, a sectional view of a one piece wheel 40 having an outboard surface, or wheel face, 42 and a process for finishing the wheel surface 42 in accordance with the present invention. The finishing involves cutting the wheel surface 42 with an improved cutting tool having a unique geometry that will be described below. An increased brightness or shine of the wheel surface is expected from the cutting process. Thus, the present invention is directed to smoothing the visible portions of a wheel face to cosmetically improve the appearance of the wheel face.

As shown in FIG. 4, the wheel 40 includes an annular wheel rim 44. A wheel disc 46 which includes the outboard surface 42 extends radially across the outboard end of the wheel rim 44. The invention contemplates clamping an inboard end of the wheel rim 44 in the jaws 47 of a lathe or a spinner chuck of a wheel lathe (not shown).

The wheel 40 is rotated about an axis 48, as shown by the arrow in FIG. 4, by the wheel lathe. An improved cutting tool 50 is mounted upon a tool holder 51 that is secured to a wheel lathe turret (not shown). The wheel lathe urges the cutting tool 50 against the outboard wheel face 42 with uniform or equalized cutting pressure to simultaneously remove material from the wheel face 42 and smooth the cut surface. In the preferred embodiment, programmable machine tools are utilized to assure that the cutting pressure is equalized for all elevations of the geometric shape of the wheel being finished. The tool 50 is traversed in a radial direction from the outboard end of the wheel rim 44 across the wheel face 42. The tool 50 moves alternately toward and away from the center of the wheel disc 46, as shown by the small arrows in FIG. 4. As the tool 50 moves across the wheel face 42, the tool 50 also is moved axially to follow the contour of the wheel face 42. The invention further contemplates that the improved cutting tool 50 can be inclined to smooth all possible inclinations of the wheel face 42, such as horizontal, vertical or inclined, as illustrated in phantom in FIG. 4. Additionally, the tool 50 can be advanced in an axial, or radial, direction to increase the amount of material removed from the wheel face 42. Liquid coolant is applied to the working surface by a conventional supply means (not shown). As will be described below, a portion of the surface of the wheel face 42 is melted and then resolidified as the tool 50 passes thereover to form a smoothed portion of the wheel face 42.

Figure 5:
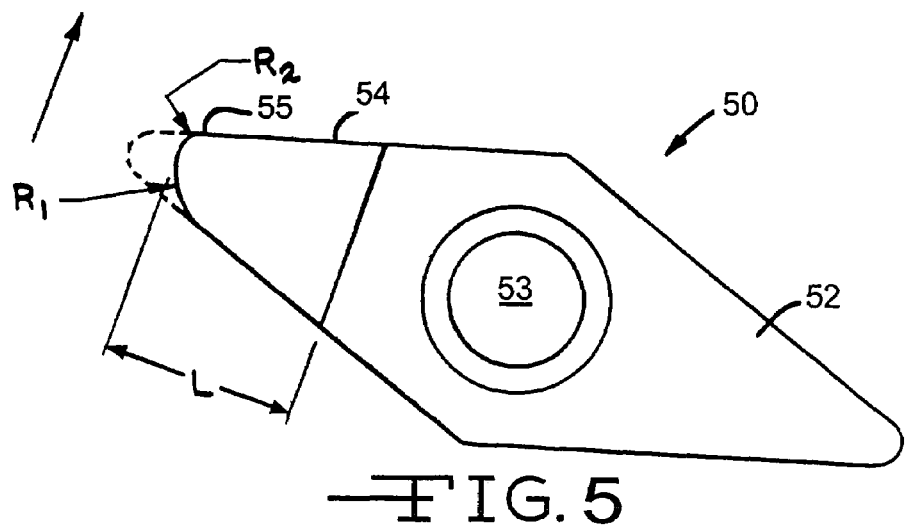
FIG. 5 is a plan view of a wheel surface finishing tool in accordance with the invention that is used in the finishing process illustrated in FIG. 4.
Figure 6:
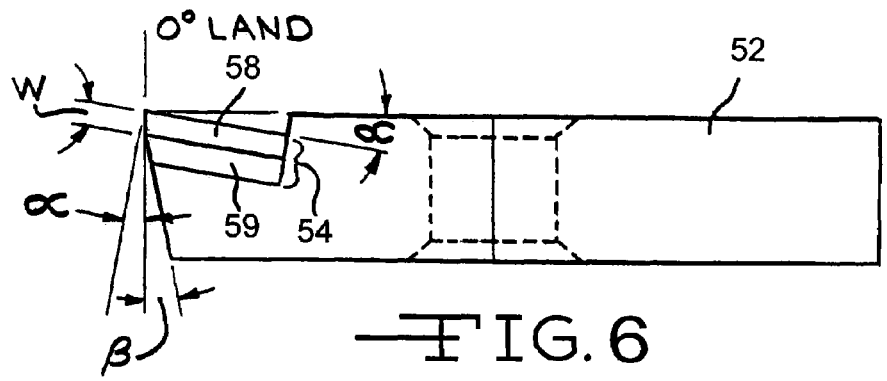
FIG. 6 is a side elevation of the surface finishing tool shown in FIG. 5.

As shown in FIGS. 5 and 6, the improved cutting tool 50 is a specially modified face cutting tool. The tool 50 has a rhombic shaped body 52 having a bore 53 formed therethrough which receives a fastener (not shown) for securing the tool to the tool holder 51. The tool 50 is formed from a sintered carbide steel and includes an insert 54 attached to one end. The insert 54 is formed from a poly crystalline material which may be either naturally occurring or synthetically produced. In the preferred embodiment, the insert 54 is formed from a Poly Crystalline Diamond (PCD) material. The insert 54 includes an improved cutting tip 55 on one end that contacts the wheel face 42 and works the metal. The arrow in the upper left portion of FIG. 5 indicates the direction of movement of the worked metal, or the wheel face 42, relative to the cutting tool 50. The insert 54 has a length L of about six mm.

The invention also contemplates applying a polycrystalline coating to a substrate to form the tool insert (not shown). The inventors believe that either a diamond or ceramic coating may be utilized. The coating would be applied either before or after the geometry of the cutting tip is formed.

The present invention contemplates a special geometry for the cutting tip 55 that is non-symmetrical, having two different radii. The leading edge of the tip 55 has a larger radius $R_1$ while the trailing edge of the tip 55 has a smaller radius $R_2$. Both radii $R_1$ and $R_2$ define arcs that are perpendicular to and meet at the centerline of the tool 50. In the preferred embodiment, the leading edge radius $R_1$ is twice the trailing edge radius $R_2$. Additionally, the leading edge radius $R_1$ is selected to be greater that the rate of feed per revolution programmed into the wheel lathe to cause multiple cutting of the wheel surface prior to the tangent point of the tip 55. In the preferred embodiment, the leading edge radius $R_1$ is 3.01 mm while the trailing edge radius $R_2$ is 1.5 mm. These radii compare to a typical standard cutting tip radius of 1.0 mm. The direction of movement of the wheel being worked is indicated by the arrow in FIG. 5.

Figure 7:
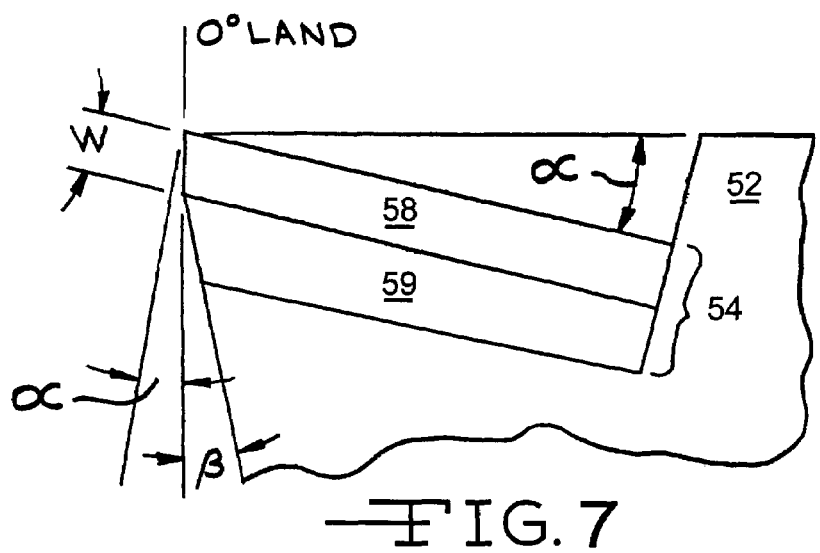
FIG. 7 is an enlarged partial side elevation of the tool shown in FIG. 6.

As best seen in FIGS. 6 and 7, the insert 54 is canted at an angle α relative to the top surface of the tool body 52. In the preferred embodiment, the angle α is seven degrees. A flat land 58 is formed around the upper edge of the insert 54. The land 58 is perpendicular, or has zero rake, to the top surface of the tool body 52. Because the insert 54 is canted relative to the tool body 52, the cutting edge of the insert 54 also forms an angle of a with the tool body top surface. Thus, the cutting edge of the insert 54 is maintained tangent to the surface of the face of the vehicle wheel. The land 58 has a width W that is in the range of between 0.076 and 0.254 mm with the preferred embodiment having a width in the range of 0.076 to 0.127 mm. The lower portion 59 of the insert 54 and the tool body 52 are undercut at an angle β to allow removal of the cut material. The angle β is in the range of five to 15 degrees and is five degrees in the preferred embodiment.

The tool holder 51 is of conventional design but is formed of an anti-vibration material, such as, for example, machinable carbide to minimize vibration by avoiding resonance. Also, the tool holder 51 is designed for a minimum extension from the wheel lathe turret to increase the rigidity of the tool 50. Additionally, it is contemplated that the associated wheel lathe includes a balanced chuck, centering, locating and clamping mechanisms.

During operation, the zero rake land of the insert tip 54 rubs the wheel surface causing "work hardening" of the wheel metal. This differs from a process commonly referred to as "smear cutting" where a tool is dragged in a "backward" direction over the workpiece to only smooth the surface. The present invention contemplates advancing the tool 50 in a "forward" direction. The arrow in the upper left portion of FIG. 5 indicates the direction of movement of the worked metal, or the wheel surface, relative to the smoothing tool 50. The unique geometry of the improved cutting tool tip 55 simultaneously removes material from the wheel face and smoothes the wheel face. In the preferred embodiment, the depth of material removed by the tool 50 is within the range of 0.05 mm to 0.1 mm. The friction between the tool tip 55 and the wheel surface generates sufficient heat to cause microscopic melting of the surface metal. The friction between the tool tip 55 and the wheel surface forces a small amount of the melted metal in front of the tip 55 and into any surface voids. The melted surface metal then resolidifies. The melting and resolidification of the metal can leave a bright surface that appears to have been polished.

The inventors believe that as a wheel solidifies following casting, a layer of oxidized metal is formed upon the surface of the wheel. The oxidized layer is melted and quickly resolidifed during the cutting process with the improved cutting tool 50. As a result, an oxidized layer does not have a chance to be formed. A similar process is utilized to provide a lustrous surface finish to gold ingots. As a gold ingot solidifies, the exterior surface becomes dull due to slight oxidation of the gold on the surface and impurities rising to the surface. A torch is used to heat and remelt the surface of the ingot to a semi-liquid state. The torch is quickly removed as soon as the ingot surface becomes shiny. This process for gold ingots is typically referred to as tinning. The inventors have found that if the feedrate for the improved tool 50 is one tenth or less than the leading edge radius $R_1$, the surface appears to have been polished. The finishing process also seals any pores that could allow air to escape from a pneumatic tire mounted upon the wheel. Accordingly, the inventors expect that the number of "leakers" will be reduced. Additionally, sealing of the surface pores prevents moisture from being absorbed by the wheel surface.

Figure 2:
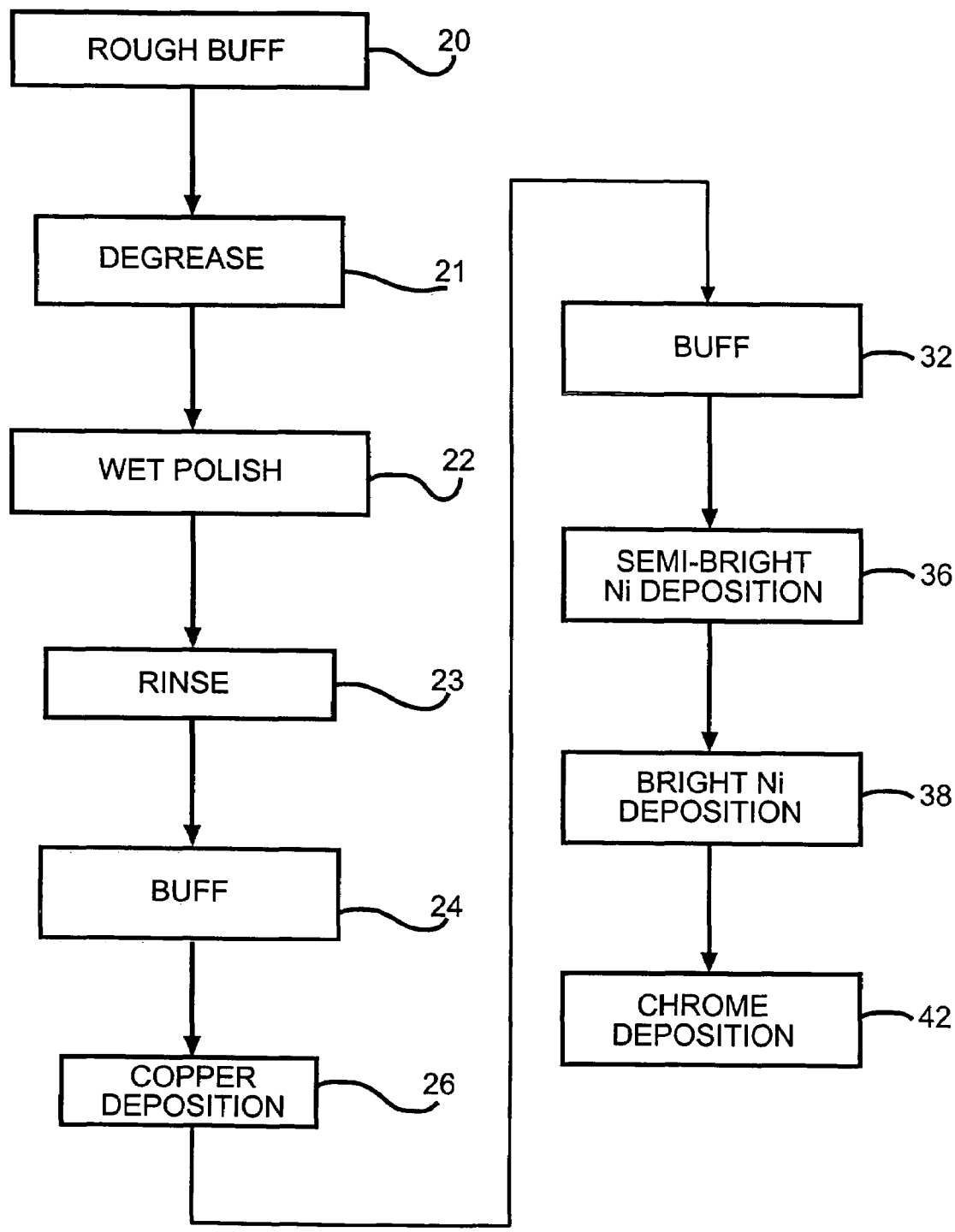
FIG. 2 is a flow chart for a known process for polishing and chrome plating a one piece vehicle wheel.

The invention further contemplates chrome plating the wheel disc face following the smoothing and sealing of the finishing process. The layer of chrome plating covers the smoothed portion of the wheel and provides an esthetically pleasing appearance. The inventors have found that the smoothing of the wheel surface described above allows omission of the polishing and buffing steps shown in FIG. 2. This, in turn eliminates the harmonically distorted pressures experienced with conventional polishing and buffing processes. Additionally, there is minimal wave effect in the wheel surface and the geometric edges of the wheel face are not rounded or softened by the abrasive effects of conventional polishing and buffing operations. The inventors have found that use of the present invention results an a clarity of the surface of the aluminum chrome plated wheel that is at a level comparable to a surgical reflective mirror or a cosmetic mirror such as used in a compact or powder room. Furthermore, the smoothing seals the surface pores, preventing absorption of moisture while the elimination of the polishing and buffing removes the possibility of contaminating the surface with polishing compounds.

Figure 1:
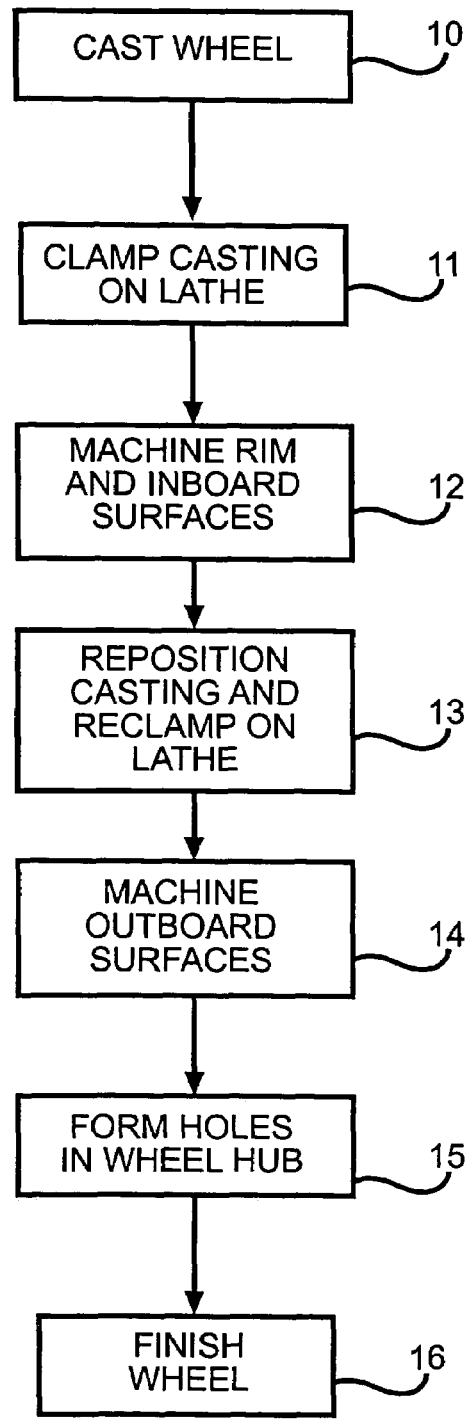
FIG. 1 is a flow chart for a known process for manufacturing a one piece vehicle wheel.
Figure 8:
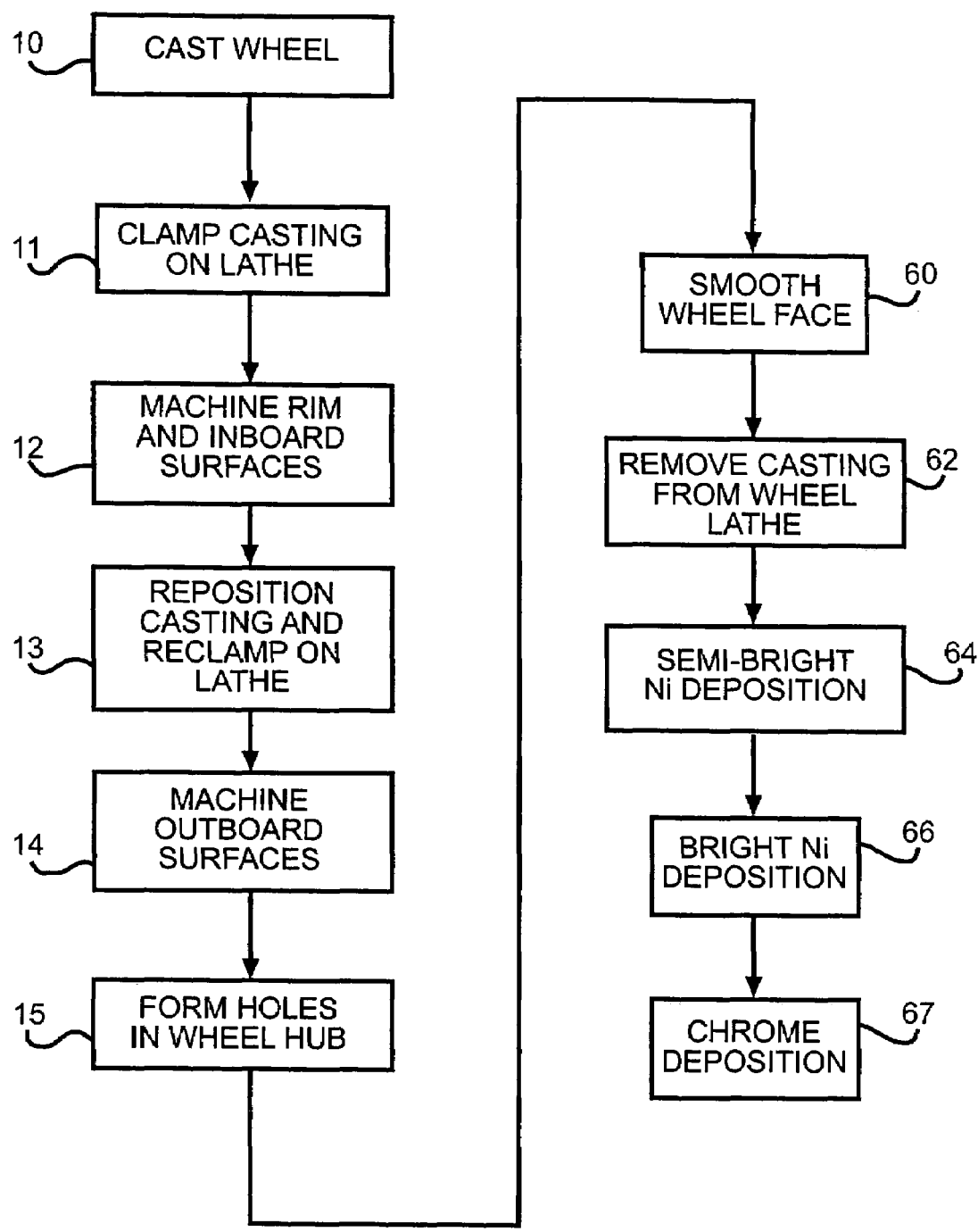
FIG. 8 is a flow chart for manufacturing a one piece vehicle wheel which includes a chrome plating process that is in accordance with the present invention.

The invention further contemplates an improved process for smoothing and chrome plating the wheel face that is illustrated by the flow chart shown in FIG. 8. Steps shown in FIG. 8 which are similar to steps shown in the flow charts in FIGS. 1 and 2 and have the same numerical designators. In FIG. 8, a vehicle wheel is cast by a conventional casting process, such as, for example, gravity or low pressure casting, in functional block 10. In functional blocks 11 through 15, the wheel casting is machined to a final shape as described above; however, a small amount of material is left for a final finishing cut with the special tool 50 described above.

In functional block 60, the outboard wheel face is smoothed on a wheel lathe or other conventional wheel finishing machine with a final finishing cut. The wheel is rotated upon the wheel lathe while a cutting tool having the unique geometry described above is urged against the outboard wheel face with a uniform cutting pressure while also being moved radially across the outboard wheel face. In the preferred embodiment, the depth of material removed by the tool 50 is within the range of 0.05 mm to 0.1 mm. Once the desired surface dimensions and finish have been achieved, the wheel is removed from the wheel lathe in functional block 62.

Figure 3:
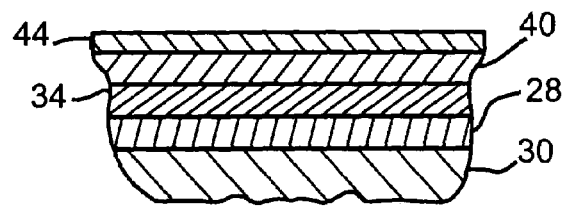
FIG. 3 is a fragmented sectional view of a wheel surface after chrome plating with the process shown in FIG. 2.
Figure 9:
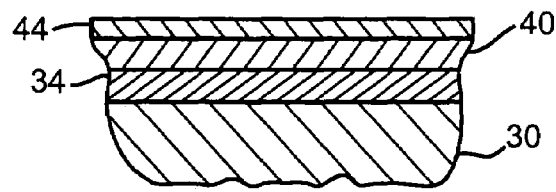
FIG. 9 is a fragmented sectional view of a wheel surface after chrome plating with the process shown in FIG. 8.

The wheel surface is then finished with an improved chrome plating process that is illustrated by the fragmentary sectional view of the wheel shown in FIG. 9, where elements that are similar to elements shown in FIG. 3 have the same numerical identifiers. The improved chrome plating process makes use of the smooth and sealed surface provided by the tool 50. Therefore, in functional block 64 a layer of semi-bright nickel 34 is chemically deposited directly upon the smoothed surface of the wheel 30. Next, a layer of bright nickel 40 is chemically deposited over the semi-bright nickel layer 34 in functional block 66. Finally, a layer of chromium 44 is chemically deposited over the bright nickel layer 40, as shown in functional block 67. In the preferred embodiment, the various metallic layers are electrochemically deposited upon the wheel by electrolysis with successive immersions in a series of tanks containing solutions of the metals used. Thus, in the improved chrome plating process, the sealing of the wheel surface 42 with the tool 50 allows elimination of the deposition of a sealing copper layer 32, as shown in functional block 26 of FIG. 2. Also, as described above, the polishing and buffing steps are eliminated from the improved chrome plating process. Accordingly, the improved chrome plating process requires less steps, significantly reducing the time required and cost incurred to chrome plate a wheel surface.

The present invention contemplates that the smoothing operation is included as one of the steps in the prior art process for machining a wheel casting. For example, a cutting tool mounted upon a tool holder formed from an anti-vibration material can be added to the turret of the wheel lathe used to machine the wheel casting and the smoothing operation included as one of the programmed machining steps for finishing the wheel casting. Alternately, a smoothing station, which is dedicated to smoothing the wheel faces, can be established at the wheel manufacturing facility.

Figure 10:
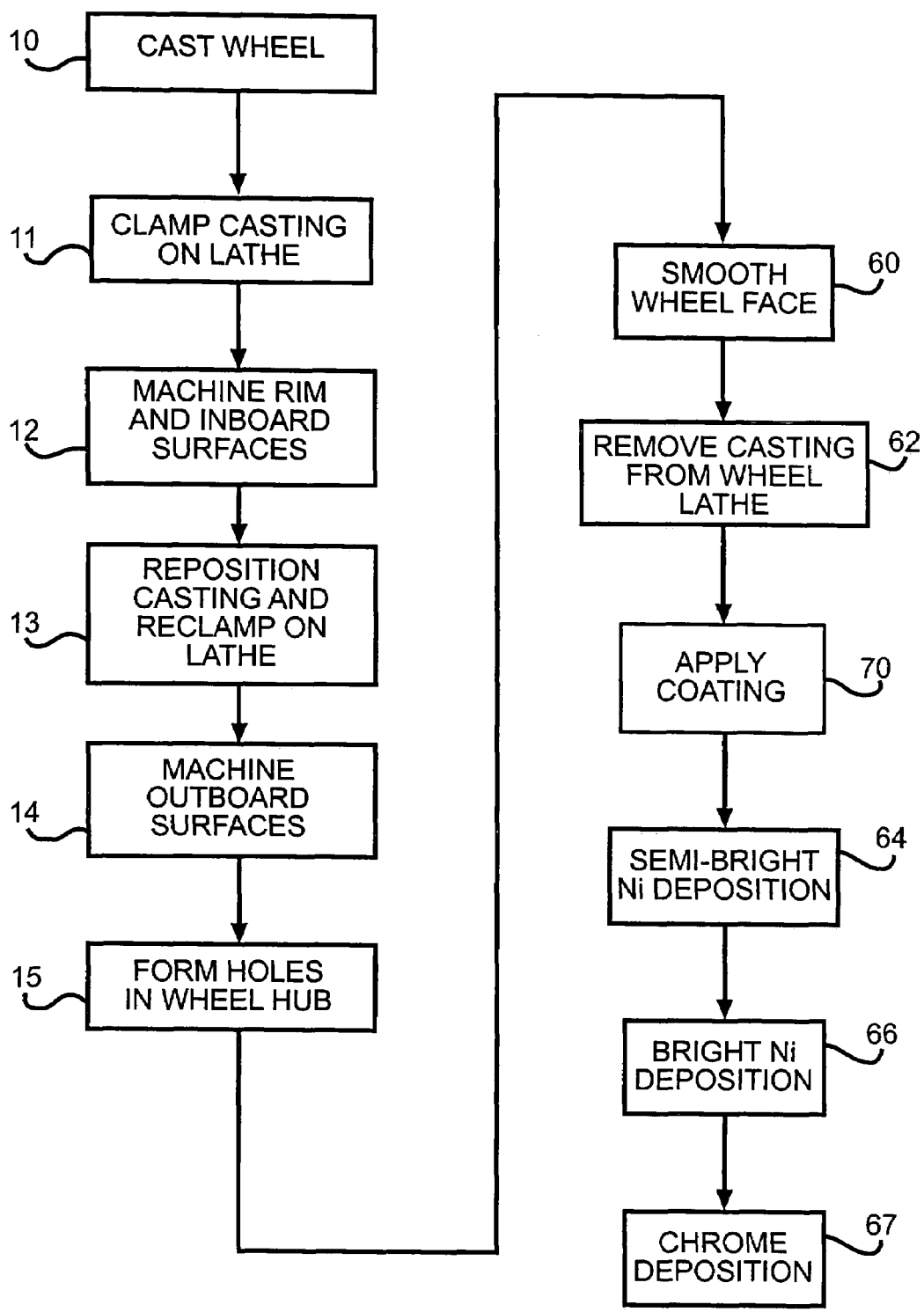
FIG. 10 is a flow chart for an alternate embodiment of the manufacturing process shown in FIG. 8.

While the preferred embodiment has been described and illustrated above as smoothing the entire outboard wheel face, it will be appreciated that only a portion of the wheel face can be smoothed. For example, the esthetic design of the wheel may require that only a portion of the wheel face is to be chrome plated with the remainder remaining as machined or painted. Accordingly, an alternate embodiment of the manufacturing process described above is illustrated by the flow chart shown in FIG. 10. As before, blocks shown in FIG. 10 that are similar to blocks shown in preceding figures have the same numerical designators. In FIG. 10, only the portion of the wheel surface which is desired to be chrome plated is smoothed in functional block 60 by a final finishing cut with the special tool 50. Therefore, the portions of the wheel surface that are not to be chrome plated are machined to their final dimensions in functional block 14. As before, the wheel is removed from the wheel lathe in functional block 62.

An electrically non-conductive coating is applied to the non-smoothed portions of the wheel in functional block 70. In the preferred embodiment, the portions of the wheel surface that were smoothed in functional block 60 are masked before the non-conductive coating is applied. For example, the portions of the wheel surface adjacent to the windows formed between the wheel spokes may be coated while the remainder of the wheel face is chrome plated. Also in the preferred embodiment, the coating is a paint that includes pigment to add color to the coated area. Alternately, the wheel surface can be covered with a clear coating or the coating may include both a layer of paint and a layer of clear coat that covers the paint. It is further contemplated that the coating may include an inert ingredient to further enhance the appearance of the wheel. In the preferred embodiment, the coating is sprayed onto the wheel surface and then cured. Once the coating has cured, the masking material is removed. Alternately, a spraying mask may be used to in place of masking material to control the application of the coating to the wheel surface.

The non-coated portions of the wheel surface are then chrome plated in functional blocks 64 through 67 by the improved chrome plating process described above with a layer of semi-bright nickel being directly deposited upon the wheel surface portions in functional block 64. In the preferred embodiment, the metallic layers are electrochemically deposited upon the wheel by electrolysis with successive immersions in a series of tanks containing solutions of the metals used. Upon immersion, the electrically non-conductive coating prevents adhesion of the chemicals contained in the solutions. Instead, the chrome plating chemicals only adhere to the bare metal portions of the wheel surface.

Figure 11:
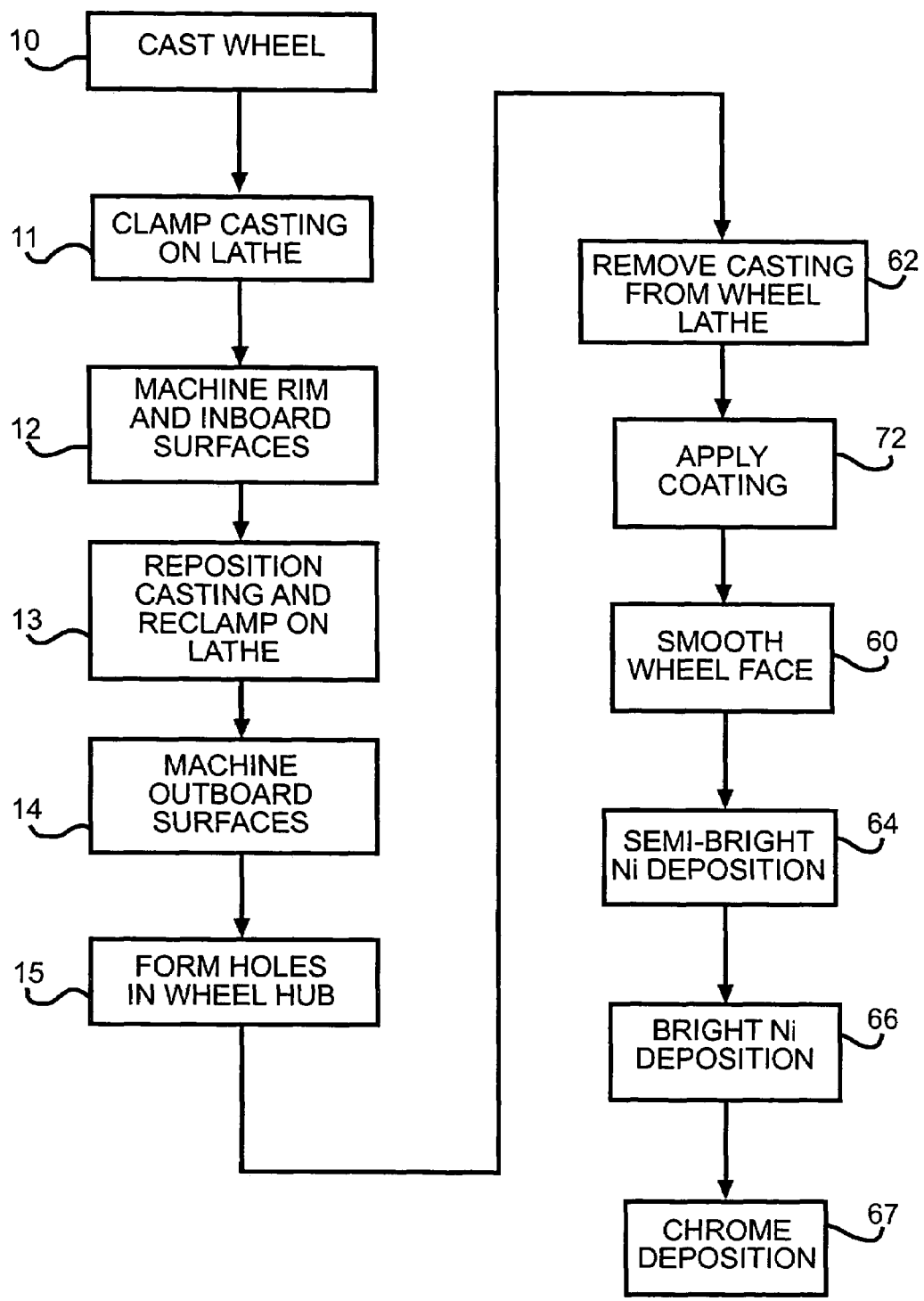
FIG. 11 is a flow chart for another alternate embodiment of the manufacturing process shown in FIG. 8.

Another alternate manufacturing process is illustrated in FIG. 11, where, as before, blocks that are similar to blocks shown in preceding figures have the same numerical designators. In FIG. 11, the coating is applied to the wheel in functional block 72 before the portions of the wheel face are smoothed with the special tool 50 in functional block 60. In the preferred embodiment, the entire wheel face is coated in functional block 72. Then, when the portions of the wheel surface to be chrome plated are smoothed by the special tool 50 in functional block 60, the tool 50 removes the coating from the portions of the face of the wheel to be chrome plated as it smoothes them. Thus, it is not necessary to mask portions of the wheel.

As before, an electrically non-conductive material is sprayed onto the wheel face in functional block 72 and then cured. As described above, the coating material can be a paint that includes pigment, a clear coat or multiple layers of paint and clear coat. Additionally, an inert ingredient may be added to the coating material to further enhance the appearance of the wheel. Alternately, as described above, masking material or a spray mask can be used to restrict the coating material to only the portions of the wheel surface that are not to be chrome plated. Once the coating is cured, the portions of the wheel face that are to be chrome plated are smoothed in functional block 60 by a final finishing cut with the special tool 50.

The non-coated portions of the wheel surface are then chrome plated in functional blocks 64 through 67, by the improved chrome plating process described above with a layer of semi-bright nickel being directly deposited upon the wheel surface portions in functional block 64. In the preferred embodiment, the metallic layers are electrochemically deposited upon the wheel by electrolysis with successive immersions in a series of tanks containing solutions of the metals used. Upon immersion, the electrically non-conductive coating prevents adhesion of the chemicals contained in the solutions. Instead, the chemicals contained in the solutions only adhere to the bare metal portions of the wheel surface.

The invention also contemplates that the entire surface of wheel can be smoothed and chrome plated with the improved process described above to enhance the cosmetic appearance to the entire wheel. Also, while the preferred embodiment has been described as being applied to cast wheels, it will be appreciated that the cosmetic appearance of wheels formed by other conventional processes also can be improved by application of the present invention. For example, the present invention also contemplates smoothing the outboard surface of forged or stamped wheel discs. Additionally, while the preferred embodiment has been illustrated and described for aluminum or aluminum alloy wheels, it will be appreciated that the invention also may be practiced on wheels formed from other metals and alloys of other metals. Finally, a layer of clear coat may be optionally applied to the chrome plated surface (not shown).

Figure 13:
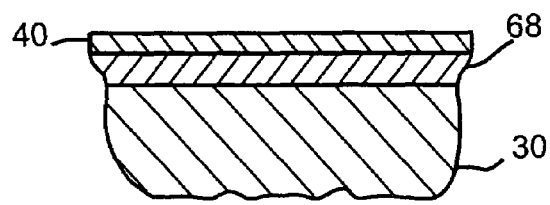
FIG. 13 is a fragmented sectional view of a wheel surface after chrome plating with the process shown in FIG. 11.
Figure 12:
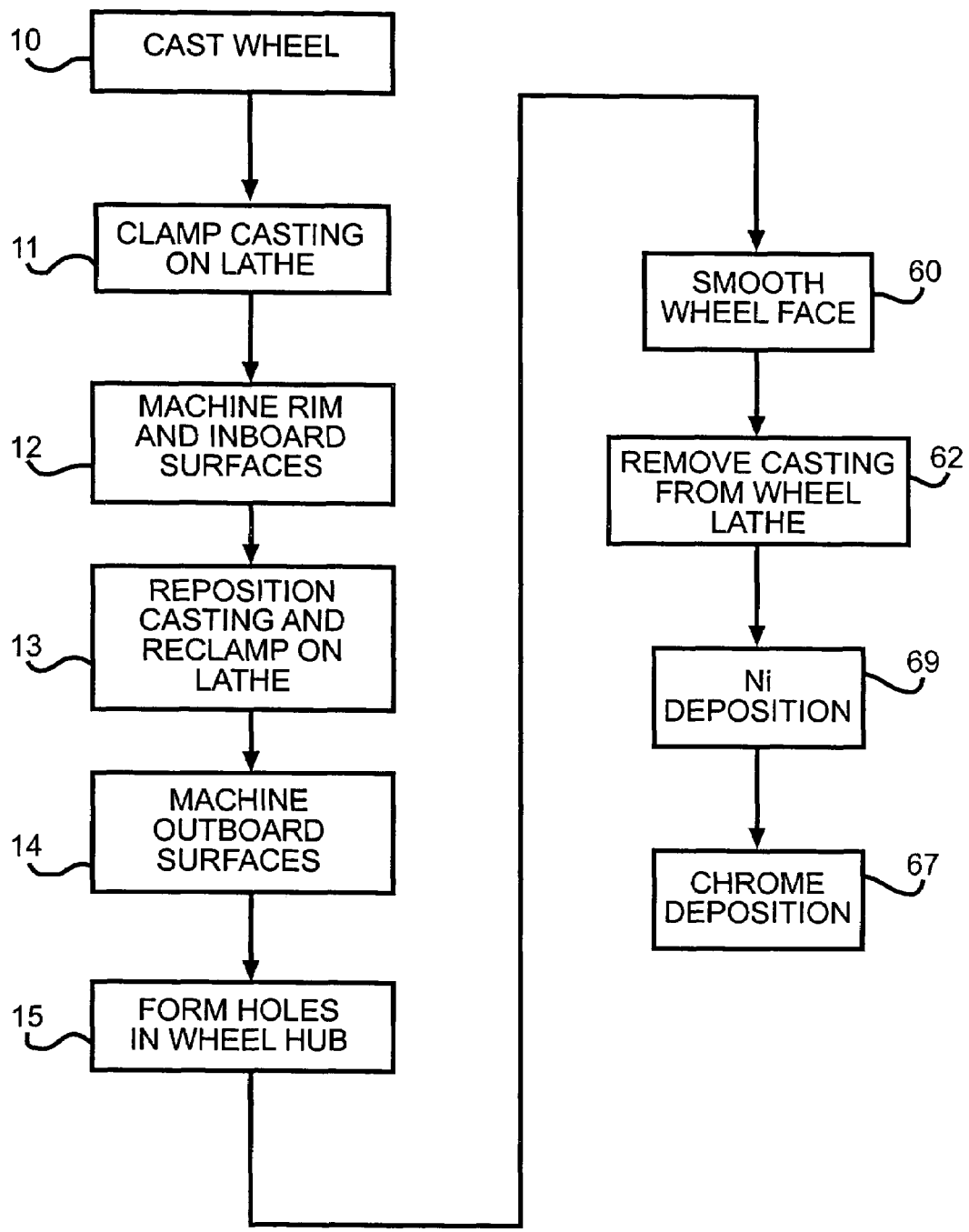
FIG. 12 is another alternate embodiment of the manufacturing process shown in FIG. 8.

The invention further contemplates another embodiment of the improved chrome plating process that is illustrated with the flow chart shown in FIG. 12. As before, functional shown in FIG. 12 that are similar to functional blocks shown in the preceding flow charts have the same numerical identifiers. The process shown in FIG. 12 is basically the same as the process shown in FIG. 8, except, as illustrated in FIG. 13, only one nickel layer 68 is chemically deposited between the surface of the wheel 30 and the chromium layer 40 in functional block 69. The nickel layer 68 may be either semi-bright or bright nickel, as determined by the specific finishing application. However, in either case, the nickel layer 68 is applied directly to the wheel surface. It will be appreciated that, while the single nickel layer process has been described in terms of the process shown in FIG. 8, the single nickel layer process also may be practiced to apply chrome plating to portions of the wheel surface by coating the wheel surface as shown in FIGS. 10 and 11 (not shown).

While the preferred embodiments of the improved chrome plating process have been described and illustrated above with two or three layers of metal applied to the wheel surface, it will be appreciated that additional non-copper layers may be applied. Thus, it is also contemplated that the invention also may be practiced to include a layer of nickel containing sulfur (not shown) that is chemically deposited between the semi-bright nickel layer 34 and the bright nickel layer 40 as a sacrificial layer. Similarly, a pre-chromium layer (not shown) formed from discontinuous chromium, may be applied over the bright nickel layer 40 before the final chromium layer 44 is deposited to enhance the durability of the chrome plating. In a like manner, the invention also contemplates that any number of additional layers may be applied to the wheel surface (not shown) to form the chrome plating. However, none of the additional layers include a copper layer deposited directly upon the wheel surface.

The inventors expect that using the improved cutting tool to cut and smooth the wheel face to enhance the cosmetic appearance thereof will cost less than buffing or polishing of the wheel face. Also, because the wheel can be smoothed on existing wheel lathes, no capital cost for polishing machines is required. The smoothing process eliminates both the exposure of personnel to toxic substances utilized during polishing and the expense of disposing of the toxic wastes generated thereby. Production time and cost will also be reduced since the need to ship the wheel to a polishing contractor will be eliminated. The improved cutting tool can extend into the wheel rim to reach the surface of a recessed wheel disc, which can be difficult to reach with polishing wheels. The cutting and smoothing preserves crisp edge surfaces which may be aesthetically desirable. Such edges tend to be blunted or removed by the abrasive nature of the polishing process. While polishing tends to highlight surface imperfections, cutting and smoothing tends to hide such surface imperfections. Additionally, the steps of buffing and copper plating can be eliminated from the chrome plating process, providing significant manufacturing time and cost savings. Finally, as described above, the present invention results in a significantly improved surface appearance and a greatly enhanced appearance of any chrome plating applied over the smoothed surface.

Figure 14:
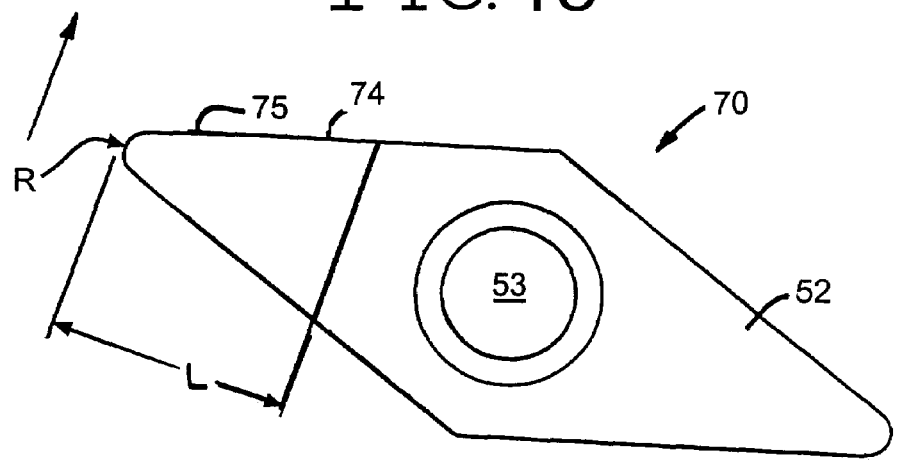
FIG. 14 is an alternate embodiment of the wheel surface finishing tool shown in FIG. 4.
Figure 15:
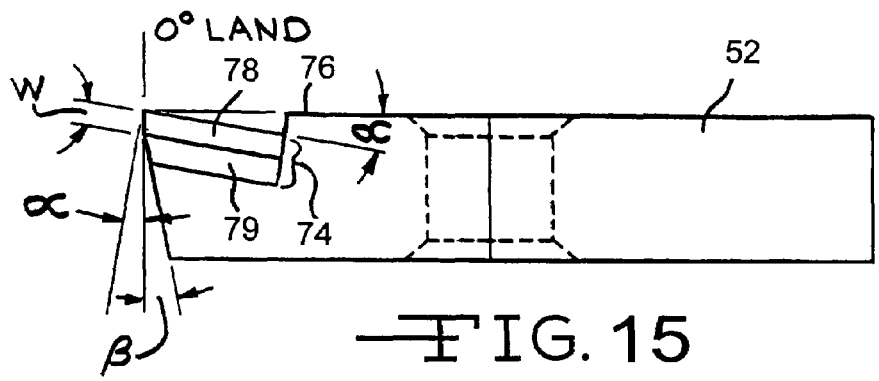
FIG. 15 is a side elevation of the surface finishing tool shown in FIG. 10.

The invention also contemplates an alternate embodiment of the special cutting/smoothing tool 50 that is illustrated generally at 70 in FIGS. 14 and 15. Components shown in FIGS. 14 and 15 that are the same as components shown in previous figures have the same numerical identifiers. The tool 70 has a rhombic shaped body 52 having a bore 53 formed therethrough which receives a fastener (not shown) for securing the tool to the tool holder 51. The tool 70 is formed from a sintered carbide steel and includes an insert 74 attached to one end. The insert 74 is formed from a mono crystalline material which may be either naturally occurring or synthetically produced. In the preferred embodiment, the insert 74 is formed from a Single Crystalline Diamond (SCD) material. The insert 74 includes an improved cutting tip 75 on one end that contacts the wheel face 42 and works the metal. The arrow in the upper left portion of FIG. 14 indicates the direction of movement of the worked metal, or the wheel surface, relative to the smoothing tool 70. As before, the insert 74 has a length L of about six mm.

Use of a mono crystalline insert 74 in place of the poly crystalline insert 54 described above significantly reduces the cost or the insert. Additionally, the cutting tip 75 is symmetrical about the centerline of the tool. In the preferred embodiment, the radius of the cutting tip, R, is formed in a ratio to the length of the tool 60 of about 1 to 16.

As best seen in FIG. 11, the insert 74 is canted at an angle a relative to the top surface 76 of the tool body 52. In the preferred embodiment, the angle a is seven degrees. A flat land 78 is formed around the upper edge of the insert 74. The land 78 is perpendicular, or has zero rake, to the tool body top surface 76. Because the insert 74 is canted relative to the tool body 52, the cutting edge of the insert 74 also forms an angle of a with the tool body top surface. Thus, the cutting tip 75 of the insert 74 is maintained tangent to the surface of the face of the vehicle wheel. The land 78 has a width W that is in the range of between 0.076 and 0.254 mm with the preferred embodiment having a width in the range of 0.076 to 0.127 mm. The lower portion 79 of the insert 74 and the tool body 52 are undercut at an angle $\beta$ to allow removal of the cut material. The angle $\beta$ is in the range of five to 15 degrees and is five degrees in the preferred embodiment.

Similar to the tool 50 having a poly crystalline insert 54, as described above, the present invention contemplates that, in the preferred embodiment, the feed rate per revolution for a wheel lathe utilizing the tool 70 having the mono-crystalline insert 74 is less that the cutting tip radius R.

While the preferred embodiment of the tool 70 has been described as having an insert 74 formed from mono crystalline material, it will be appreciated that the insert 74 also may be formed from a poly crystalline material, such as a Poly Crystalline Diamond (PCD) material. The invention also contemplates applying a poly or mono crystalline coating to a substrate to form the tool insert (not shown). The inventors believe that either a diamond or ceramic coating may be utilized. The coating would be applied either before or after the geometry of the cutting tip is formed.

The invention further contemplates applying a layer of clear coating over the entire outboard surface of the wheel to include the chrome plated portion (not shown); however, this step is optional. Additionally, the invention contemplates applying the improved chrome plating process described above to a wheel surface that has been smoothed by any tool and/or process that seals the surface pores sufficiently to prevent absorption of moisture or surface contaminants.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been described for a one piece vehicle wheel, it will be appreciated that the invention also can be practiced upon two piece vehicle wheels having cast full face modular wheel discs. Also, the invention can be practiced upon a wheel spider which is disposed within a wheel rim.

What is claimed is:

1. A process for forming a decorative surface upon an outboard surface of a wheel disc, the process comprising the steps of:

(a) providing a cutting tool for smoothing a wheel surface that includes a rhombic shaped body portion having a mounting aperture formed therethrough and an insert having a cutting tip carried upon one end of the body portion, the insert having arcuate leading and trailing edges, the insert also having a zero degree land formed thereabout whereby the cutting edge of the insert is maintained tangent to the wheel surface;

(b) mounting a machined vehicle wheel including a wheel rim and having a wheel disc extending radially across the wheel rim on a lathe;

(c) rotating the wheel;

(d) urging the cutting tool provided in step (a) with a uniform pressure against an outboard surface of the wheel disc and traversing the cutting tool in a radial direction across the outboard surface of the wheel disc to smooth at least a portion of the outboard wheel disc surface such that the smoothed portion of the wheel disc outboard surface has a polished appearance;

(e) depositing a layer of semi-bright nickel directly upon the portion of the wheel disc surface smoothed in step (d) and;

(f) depositing a layer of bright nickel over the semi-bright nickel layer deposited in step (e1); and (g) depositing a layer of chromium over the bright nickel layer deposited in step (f).

2. The process according to claim 1 wherein the cutting tool insert is formed from a crystalline material.

3. The process according to claim 1 wherein the cutting tool insert is coated with a layer formed from a hard substance.

4. The process according to claim 1 wherein the cutting tool insert leading edge has a leading edge radius and the trailing edge has a trailing edge radius and further wherein the leading edge radius is greater than the trailing edge radius.

5. The process according to claim 1 wherein the cutting tool insert has a leading edge having a leading edge radius and a trailing edge having a trailing edge radius and further wherein the leading edge radius is equal to the trailing edge radius.

6. A process for forming a decorative surface upon an outboard surface of a wheel disc, the process comprising the steps of:

(a) providing a cutting tool for smoothing a wheel surface that includes a rhombic shaped body portion having a mounting aperture formed therethrough and an insert having a cutting tip carried upon one end of the body portion, the insert having arcuate leading and trailing edges, the insert also having a zero degree land formed thereabout whereby the cutting edge of the insert is maintained tangent to the wheel surface;

(b) mounting a machined vehicle wheel including a wheel rim and having a wheel disc extending radially across the wheel rim on a lathe;

(c) rotating the wheel;

(d) urging the cutting tool provided in step (a) with a uniform pressure against an outboard surface of the wheel disc and traversing the cutting tool in a radia direction across the outboard surface of the wheel disc to smooth at least a portion of the outboard wheel disc surface such that the smoothed portion of the wheel disc outboard surface has a polished appearance;

(e) depositing a single layer of nickel material selected from the group consisting of semi-bright nickel and bright nickel directly upon the portion of the wheel disc surface smoothed in step (d); and (f) depositing a layer of chromium over the layer of nickel material deposited in step (e).

7. The process according to claim 6 wherein the cutting tool insert is formed from a crystalline material.

8. The process according to claim 6 wherein the cutting tool insert is coated with a layer formed from a hard substance.

9. The process according to claim 6 wherein the cutting tool insert leading edge has a leading edge radius and the trailing edge has a trailing edge radius and further wherein the leading edge radius is greater than the trailing edge radius.

10. The process according to claim 6 wherein the cutting tool insert has a leading edge having a leading edge radius and a trailing edge having a trailing edge radius and further wherein the leading edge radius is equal to the trailing edge radius.

11. A process for forming a decorative surface upon an outboard-surface of a wheel disc, the method comprising the steps of:

(a) providing a cutting tool for smoothing a wheel surface that includes a rhombic shaped body portion having a mounting aperture formed therethrough and an insert having a cutting tip carried upon one end of the body portion, the insert having arcuate leading and trailing edges, the insert also having a zero degree land formed thereabout whereby the cutting edge of the insert is maintained tangent to the wheel surface;

(b) applying a coating formed from an electrically non-conductive material to a surface of a machined vehicle wheel that includes a wheel rim and that has a wheel disc extending radially across the wheel rim, the coating being applied to at least a portion of an outboard surface of the wheel disc;

(c) mounting the machined vehicle wheel on a lathe;

(d) rotating the wheel;

(e) urging the cutting tool provided in step (a) with a uniform pressure against the outboard surface of the wheel disc and traversing the cutting tool in a radial direction across the outboard surface of the wheel disc such that a portion of the coating applied in step (b) is removed and the portion of the wheel disc outboard surface from which the coating was removed is smoothed and has a polished appearance;

(f) depositing a layer of semi-bright nickel directly upon the portion of the wheel disc surface smoothed in step (e);

(g) depositing a layer of bright nickel over the semi-bright nickel layer deposited in step (f); and (h) depositing a layer of chromium over the bright nickel layer deposited in step (g).

12. The process according to claim 11 wherein the cutting tool insert leading edge has a leading edge radius and the trailing edge has a trailing edge radius and further wherein the leading edge radius is greater than the trailing edge radius.

13. The process according to claim 11 wherein the cutting tool insert has a leading edge having a leading edge radius and a trailing edge having a trailing edge radius and further wherein the leading edge radius is equal to the trailing edge radius.

14. A process for forming a decorative surface upon an outboard surface of a wheel disc, the method comprising the steps of:

(a) providing a cutting tool for smoothing a wheel surface that includes a rhombic shaped body portion having a mounting aperture formed therethrough and an insert having a cutting tip carried upon one end of the body portion, the insert having arcuate leading and trailing edges, the insert also having a zero degree land formed thereabout whereby the cutting edge of the insert is maintained tangent to the wheel surface;

(b) applying a coating formed from an electrically non-conductive material to a surface of a machined vehicle wheel that includes a wheel rim and that has a wheel disc extending radially across the wheel rim, the coating being applied to at least a portion of an outboard surface of the wheel disc;
(c) mounting the machined vehicle wheel on a lathe;
(d) rotating the wheel;
(e) urging the cutting tool provided in step (a) with a uniform pressure against the outboard surface of the wheel disc and traversing the cutting tool in a radial direction across the outboard surface of the wheel disc such that a portion of the coating applied in step (b) is removed and the portion of the wheel disc outboard surface from which the coating was removed is smoothed and has a polished appearance;
(f) depositing a single layer of nickel material selected from the group consisting of semi-bright nickel and bright nickel directly upon the portion of the wheel disc surface smoothed in step (e) whereby the remaining coating prevents adhesion of the chrome plating chemicals such that only the portions smoothed in step (e) are plated with the selected nickel material; and
(g) depositing a layer of chromium over the layer of nickel material deposited in step (f).

15. The process according to claim 14 wherein the cutting tool insert leading edge has a leading edge radius and the trailing edge has a trailing edge radius and further wherein the leading edge radius is greater than the trailing edge radius.

16. The process according to claim 14 wherein the cutting tool insert has a leading edge having a leading edge radius and a trailing edge having a trailing edge radius and further wherein the leading edge radius is equal to the trailing edge radius.

17. A process for forming a decorative surface upon an outboard surface of a wheel disc, the method comprising the steps of:
(a) providing a cutting tool for smoothing a wheel surface that includes a rhombic shaped body portion having a mounting aperture formed therethrough and an insert having a cutting tip carried upon one end of the body portion, the insert having arcuate leading and trailing edges, the insert also having a zero degree land formed thereabout whereby the cutting edge of the insert is maintained tangent to the wheel surface;
(b) mounting a machined vehicle wheel including a wheel rim and having a wheel disc extending radially across the wheel rim on a lathe;
(c) rotating the wheel;
(d) urging the cutting tool provided in step (a) with a uniform pressure against at least a portion of an outboard surface of the wheel disc and traversing the cutting tool in a radial direction across the outboard surface of the wheel disc such that a portion of the wheel disc outboard surface is smoothed and has a polished appearance;
(e) applying a coating formed from an electrically non-conductive material to the portion of the wheel disc surface that was not smoothed in step (g); and
(f) chrome plating the wheel whereby the electrically non-conductive coating prevents adhesion of the chrome plating chemicals such that only the portions of the outboard wheel disc surface that were smoothed in step (d) are chrome plated.

18. The process according to claim 17 wherein step (f) includes:
(f1) depositing a layer of semi-bright nickel directly upon the portion of the wheel disc surface smoothed in step (d);
(f2) depositing a layer of bright nickel over the semi-bright nickel layer deposited in step (f1); and
(f3) depositing a layer of chromium over the bright nickel layer deposited in step (f2).

19. The process according to claim 17 wherein step (f) includes:
(f1) depositing a single layer of nickel material selected from the group consisting of semi-bright nickel and bright nickel directly upon the portion of the wheel disc surface smoothed in step (d); and
(f2) depositing a layer of chromium over the layer of nickel material deposited in step (f1).

20. The process according to claim 17 wherein the cutting tool insert leading edge has a leading edge radius and the trailing edge has a trailing edge radius and further wherein the leading edge radius is greater than the trailing edge radius.

21. The process according to claim 17 wherein the cutting tool insert has a leading edge having a leading edge radius and a trailing edge having a trailing edge radius and further wherein the leading edge radius is equal to the trailing edge radius.

22. A process for forming a decorative surface upon an outboard surface of a wheel disc, the method comprising the steps of:
(a) providing a cutting tool for both smoothing a wheel surface and sealing any surface pores that are included in the surface;
(b) mounting a machined vehicle wheel including a wheel rim and having a wheel disc extending radially across the wheel rim on a lathe;
(c) rotating the wheel;
(d) urging the cutting tool provided in step (a) with a uniform pressure against at least a portion of an outboard surface of the wheel disc and traversing the cutting tool in a radial direction across the outboard surface of the wheel disc such that at least a portion of the wheel disc outboard surface is smoothed and any surface pores are sealed with the smoothed surface having a polished appearance; and
(e) chrome plating the smoothed portion of the outboard wheel disc surface.

23. The process according to claim 22 wherein step (e) includes:
(e1) depositing a layer of semi-bright nickel directly upon the portion of the wheel disc surface smoothed in step (d);
(e2) depositing a layer of bright nickel over the semi-bright nickel layer deposited in step (e1); and
(e3) depositing a layer of chromium over the bright nickel layer deposited in step (d2).

24. The process according to claim 22 wherein step (d) includes:
(e1) depositing a single layer of nickel material selected from the group consisting of semi-bright nickel and bright nickel directly upon the portion of the wheel disc surface smoothed in step (d); and
(e2) depositing a layer of chromium over the layer of nickel material deposited in step (e1).

25. A process for forming a decorative surface upon an outboard surface of a wheel disc, the method comprising the steps of:
(a) providing a cutting tool for both smoothing a wheel surface and sealing any surface pores that are included in the surface;
(b) applying a coating formed from an electrically non-conductive material to a surface of a machined vehicle wheel that includes a wheel rim and that has a wheel disc extending radially across the wheel rim, the coating being applied to at least a portion of an outboard surface of the wheel disc;

(c) mounting the machined vehicle wheel on a lathe;

(d) rotating the wheel;

(e) urging the cutting tool provided in step (a) with a uniform pressure against an outboard surface of the wheel disc and traversing the cutting tool in a radial direction across the outboard surface of the wheel disc such that at least a portion of the coating applied in step (b) is removed and the portion of the wheel disc outboard surface from which the coating was removed is smoothed and any surface pores are sealed with the smoothed surface having a polished appearance; and (f) chrome plating the wheel whereby the electrically non-conductive coating prevents adhesion of the chrome plating chemicals such that only the portions smoothed in step (d) are chrome plated.

26. The process according to claim 25 wherein step (f) includes:

(f1) depositing a layer of semi-bright nickel directly upon the portion of the wheel disc surface smoothed in step (e);

(f2) depositing a layer of bright nickel over the semi-bright nickel layer deposited in step (f1); and (f3) depositing a layer of chromium over the bright nickel layer deposited in step (f2).

27. The process according to claim 25 wherein step (f) includes:

(f1) depositing a single layer of nickel material selected from the group consisting of semi-bright nickel and bright nickel directly upon the portion of the wheel disc surface smoothed in step (e); and (f2) depositing a layer of chromium over the layer of nickel material deposited in step (f1).

28. A process for forming a decorative surface upon an outboard surface of a wheel disc, the method comprising the steps of:

(a) providing a cutting tool for both smoothing a wheel surface and sealing any surface pores that are included in the surface;

(b) mounting a machined vehicle wheel including a wheel rim and having a wheel disc extending radially across the wheel rim on a lathe;

(c) rotating the wheel;

(d) urging the cutting tool provided in step (a) with a uniform pressure against an outboard surface of the wheel disc and traversing the cutting tool in a radial direction across the outboard surface of the wheel disc such that a portion of the wheel disc outboard surface is smoothed and any surface pores are sealed with the smoothed surface, having a polished appearance;

(e) applying a coating formed from an electrically non-conductive material to the portion of the wheel disc surface that was not smoothed in step (d); and (f) chrome plating the wheel whereby the electrically non-conductive coating prevents adhesion of the chrome plating chemicals such that only the portions machined in step (d) are chrome plated.

29. The process according to claim 28 wherein step (f) includes:

(f1) depositing a layer of semi-bright nickel directly upon the portion of the wheel disc surface smoothed in step (d);

(f2) depositing a layer of bright nickel over the semi-bright nickel layer deposited in step (f1); and (f3) depositing a layer of chromium over the bright nickel layer deposited in step (f2).

30. The process according to claim 28 wherein step (f) includes:

(f1) depositing a single layer of nickel material selected from the group consisting of semi-bright nickel and bright nickel directly upon the portion of the wheel disc surface smoothed in step (d); and (f2) depositing a layer of chromium over the layer of nickel material deposited in step (f1).

* * * * *

UNITED STATES PATENT AND TRADEMARK OFFICE
CERTIFICATE OF CORRECTION

PATENT NO. : 6,997,787 B2  Page 1 of 1
DATED : February 14, 2006
INVENTOR(S) : Geoffrey L. Gatton et al.

It is certified that error appears in the above-identified patent and that said Letters Patent is hereby corrected as shown below:

Column 13,
Line 49, delete "radia" and insert -- radial --.

Signed and Sealed this

Eighteenth Day of April, 2006

JON W. DUDAS
*Director of the United States Patent and Trademark Office*